United States Patent [19]
Johnston et al.

[11] Patent Number: 5,265,994
[45] Date of Patent: Nov. 30, 1993

[54] MOLD BOLT AND MEANS FOR ACHIEVING CLOSE TOLERANCES BETWEEN BOLTS AND BOLT HOLES

[75] Inventors: David L. Johnston, Elkmont; Phillip G. Bryant, Huntsville, both of Ala.

[73] Assignee: The United States of America as represented by the Administrator of the National Aeronautics and Space Administration, Washington, D.C.

[21] Appl. No.: 9,909

[22] Filed: Jan. 27, 1993

[51] Int. Cl.⁵ .................. F16B 39/02; F16B 39/00
[52] U.S. Cl. ........................... 411/82; 411/258; 411/930; 425/129.1
[58] Field of Search .............. 411/82, 257, 258, 930; 403/266; 425/129.1

[56] References Cited

U.S. PATENT DOCUMENTS

| | | | |
|---|---|---|---|
| 3,472,301 | 10/1969 | Pearce, Jr. | 411/258 |
| 3,564,798 | 2/1971 | Darby et al. | 411/82 X |
| 3,907,442 | 9/1975 | Reid | 411/258 X |
| 4,776,738 | 10/1988 | Winston | 411/82 |

Primary Examiner—Neill R. Wilson
Attorney, Agent, or Firm—Robert L. Broad, Jr.; Guy M. Miller; John R. Manning

[57] ABSTRACT

In the space shuttle, a cargo bay storage rack was required which was to be manufactured from a metal-plastic composite and bolted to a cargo structure. Following completion, utilization of the rack was disallowed due to tolerances, that is, the size differences between the outside bolt diameter and the inside hole diameter. In addition to the space shuttle problem there are other close tolerance requirements for bolts. Such environments often benefit from close tolerance bolting. Frequently such fabrication is not cost effective. Consequently there is a need for means of achieving close tolerances between bolts and bolt holes. Such means are provided herein. After compressing the elements together a strong rigid plastic, ceramic, or ceramic plastic fluid is forced into a channel extending through the bolt.

5 Claims, 1 Drawing Sheet

MOLD BOLT AND MEANS FOR ACHIEVING CLOSE TOLERANCES BETWEEN BOLTS AND BOLT HOLES

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435, 42 U.S.C. 2457).

BACKGROUND OF THE INVENTION

This invention pertains to a method and means for bolting together elements having holes which are so large or irregularly shaped that they fit loosely around the bolt. Apart from lacking in strength, such elements are sometimes even difficult to bolt together. The method of this invention is particularly important wherein end uses demand that the elements fit tightly around the bolt. In one of its aspects the invention compensates for bolt holes of different sizes when multiple elements are being bolted together. In another of its aspects the invention applies to elements, and especially to composites, whose bolt holes were not formed at close tolerances, but whose end use demands a close tolerance fit.

In the space shuttle, a cargo bay storage rack was required which was to be manufactured from a metal-plastic composite and bolted to a cargo bay structure. Following completion, utilization of the rack was disallowed due to tolerances, that is, the size differences between the outside bolt diameter and the inside hole diameter. For acceptance the hole had to have a close tolerance fit with the bolt. Close tolerance means no more than 0.002 inch clearance between the bolt and the edge of the bolt hole. Upon investigation it was found that the required bolt-bolt hole tolerances were painstakingly, if not prohibitively, exacting to achieve.

In addition to the space shuttle problem there are other close tolerance requirements for bolts, for instance, plates or flanges on instruments, machines and pipes which are subjected to vibrations and shock. Large instruments, pipelines and other apparatus in rooms housing generators and the like often benefit from close tolerance bolting. However frequently such fabrication is not cost effective. There is a need, then, for means of achieving close tolerances between bolts and bolt holes without machine tooling. Such means are provided herein, along with a method for accomplishing the end result.

SUMMARY OF THE INVENTION

In one aspect the invention encompasses a method for adapting elements so they can be bolted together when their bolt holes fit loosely around a bolt securing the elements, but wherein end uses demand that the holes be so sized that the elements fit tightly around the bolt being used. Elements with irregularly shaped holes, or holes which are too large are tightened onto a bolt disregarding the large sizes or irregular shapes. After compressing the elements together a strong rigid plastic, ceramic, or ceramic plastic in fluid form is forced into a channel extending through the bolt and into the bolt holes, filling the spaces between the bolt and the bolt hole surfaces of the elements.

A mold bolt is also provided for carrying out the process of the invention. The mold bolt herein includes a rod having a head end and a threaded end with terminal threads. The head end includes a body portion, and a head adapted to permit the rod to be rotated in a bolt or plate for tightening. The threaded end includes a stem integral with the body portion, and an abutment for retention of elements on the stem between the abutment and the threads. The stem and the bolt ultimately securing or holding the elements together are the same size, in diameter and length, so the stem can be inserted in the holes in the elements being bolted. An interior longitudinal fluid flow passage is provided within the rod. It extends from a inlet opening in the head end, through the body portion, into the stem, to a tubular outlet opening in said stem between the abutment and the threads. Also provided are means for forcing fluid into the flow passage inlet and through the tubular outlet opening in the stem to fill the spaces between the bolt and the bolt hole edges when elements are on the stem.

THE INVENTION

In turbine engine repair wherein bolt holes have grown larger due to wear and tear resulting from slight movement, or from constant vibration, it is known to utilize annular plastic and ceramic inserts. The inserts are fabricated with a center hole the size of the bolt, but subsequently the bolt hole in the element being bolted, such as engine flanges, ears or projections must be drilled to the outside diameter of the annular insert. The insert is then driven into, or bonded in, the hole thus drilled in the engine flange. While being a satisfactory solution to a wear problem, this method of fabrication nevertheless involves sizing both the bolt hole and the hole in the annular insert. Moreover the prior art method does not solve the tolerance problem, that of correcting a tolerance between a bolt and the bolt hole when it is a few thousandths of an inch off. The method herein solves both wear and tolerance problems. It might be said that by the method herein an insert is made in situ. This can best be understood from a further description of the invention in conjunction with the accompanying drawings.

DETAILED DESCRIPTION OF THE INVENTION

Figure 1:
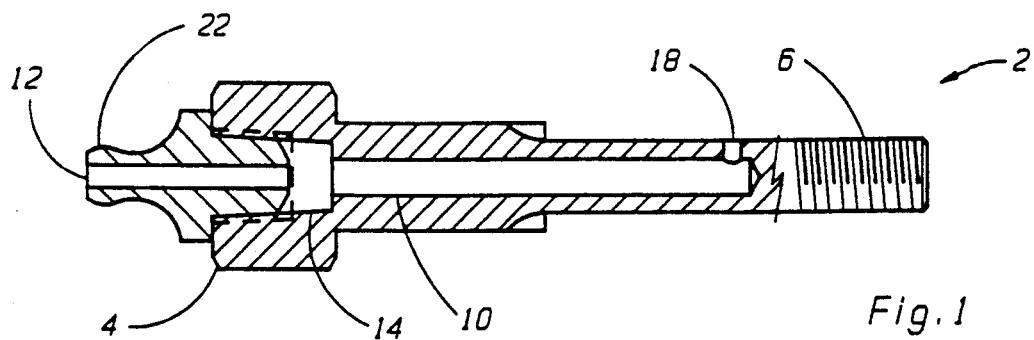
FIG. 1 is a cross sectional view of a mold bol of the invention.

In its preferred embodiment, the invention pertains to a mold bolt, one form of which is illustrated in FIG. 1. As in conventional bolts, the mold bolt 2 of this invention is provided with a head 4 and threads 6. Head 4 provides flat surfaces for tightening mold bolt 2. Threads 6 are adapted to fit a bolt or plate confining elements, or a composite thereof, whose bolt holes are not properly sized. The elements are held on stem 8 as will be described in conjunction with FIG. 3.

An important feature of mold bolt 2 is internal fluid flow passageway 10. This passageway includes an inlet 12, a cavity 14, and outlet 18. The inlet 12 to internal passageway 10 opens to the outside through a ball-shaped end 22 adapted to receive a coupling, such as a zerk fitting, for a device for injecting fluid into passageway 10.

Figure 2:
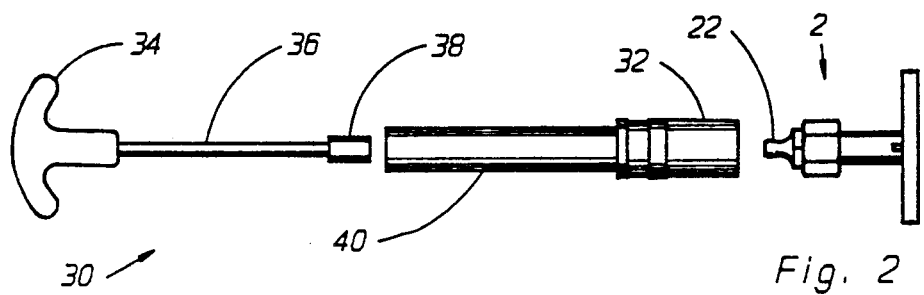
FIG. 2 is a cross sectional view illustrating a fluid injector used in conjunction with the mold bolt of the invention.

A desirable fluid injector suitable for use with the mold bolt of this invention is illustrated in FIG. 2. This injector 30, having a coupler 32, fitting ball end 22 of mold bolt 2, resembles a grease gun. It includes a handle 34, a plunger 36, and a piston 38 for forcing ceramic or plastic in a fluid state through barrel 40 and coupler 32 into mold bolt opening inlet 12.

Having described the mold bolt and its injector, the process of the invention will now be described. As indicated, the preferred purpose of this invention is to provide a means for filling a cavity formed by different diameter holes in multilayers of different materials that are eccentric with one another. The injection must be controlled so the injected material does not flow between the layers of material, the elements, and does not flow into the nutplate on the back of the assembly.

Figure 3:
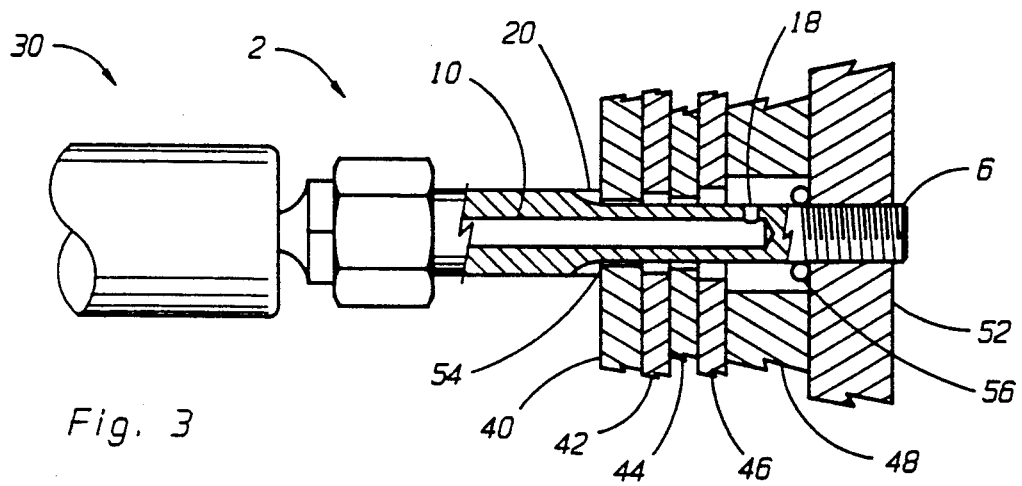
FIG. 3 shows, in cross section, the use of the mold bolt of the invention.

FIG. 3 shows a mold bolt 2 within a stack of elements, such as metal, plastic, and the like which are to be held ultimately by a bolt in a very close fit. The mold bolt 2 has a threaded end 6 which is threaded into a support plate 52. The mold bolt length is selected such that, when it is threaded into support plate 52 a shoulder 54 abuts end layer 40 to hold stacked elements 42, 44, 46, and 48 in place. Each of the elements, layers in this composite, is provided with a hole through which the bolt 2 extends. As can be seen, the holes may be of different sizes. In addition the mold bolt does not necessarily extend exactly through the center of each hole. The holes may be eccentric with respect to the mold bolt.

By means of injector 30 a ceramic epoxy is injected through mold bolt passageways 10 and exits through outlet orifice 18 to fill the voids in the bolt holes, that is, the volume surrounding the mold bolt. In this preferred embodiment a pair of slots 20 are provided on each side of the mold bolt. The operator knows that the voids are full when he sees the epoxy coming out of the slots. Desirably also, an 0-ring 56 is positioned against the support plate 52 to prevent epoxy from wicking into the threads of the bolt.

After the epoxy has cured, the mold bolt, which was previously coated with a mold release, is removed from within the stack and replaced with the ultimately employed bolt to hold the stack. It is understood that the diameter of the bolt ultimately used, and that of the stem of the mold bolt will be identical. Desirably also, if the same plate 52 is used, the threads will be identical.

It can be seen that the mold bolt of the invention has several unique features. It is manufactured to a close tolerance matching the bolt ultimately used because that ultimate bolt required a close tolerance fit. The threads on the mold bolt are the correct length so they engage the nutplate without protruding into the bolt holes being filled creating a stress point in the ceramic. The slots or chamfers and O-ring render the process easier to carry out.

Figure 4:
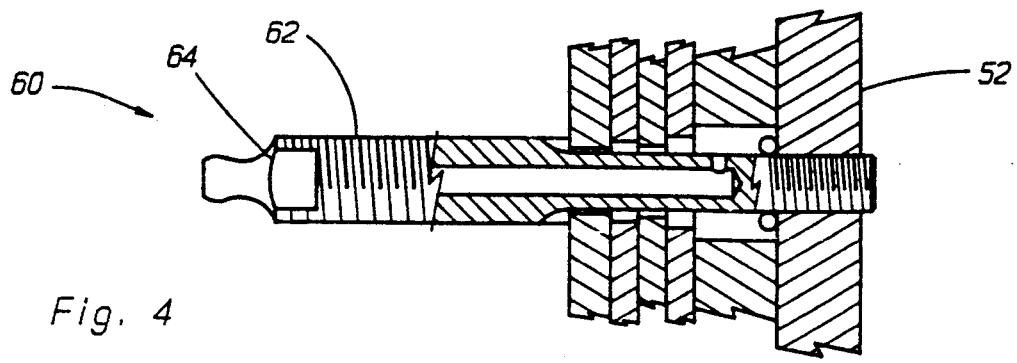
FIG. 4 is a sectional view of an embodiment of the invention illustrating the process.

Having been given the teachings of this invention ramifications and modifications will occur to those skilled in the art. As an example the process can be used without the mold bolt of the invention. As shown in FIG. 4 the fastening means 60 ultimately used can be in the form of a threaded stud, with threads 62 for use in conjunction with end use hardware assembly, such as wrench flats 64 which are used to assemble fastener 60 to plate 52, and features similar to bolt 2 in FIG. 1 for the flow of ceramic fluids. The insert material can then be injected as described hereinbefore but the bolt need not be removed after the process is complete.

As another modification, it will be obvious that the injector illustrated in FIG. 2 need not be used. Various pressure systems are known for injecting plastic fluids into a channel. Further various ceramics and plastics will occur to those in the field. From among those utilized for inserts such as those described those having the correct consistency and a high compressive strength in the range of 12,000 to 15,000 psi will be selected. Desirable materials are ceramic based, and metal containing epoxide resins, such as Devcon Ceramic Based Epoxides and Devcon Titanium Based Epoxides. However in other environments polyesters, phenolics, and polyepoxides can be employed which include quartz, limestone, and metal oxides as reinforcing agents. As another modification it will be obvious that in lieu of a threaded end plate a plate or washer with an appropriately sized hole for the bolt, followed by a nut can be used. Other uses will also occur to those working with the invention. In addition to stacks of elements the invention will be valuable for engine bolts, compressors, generators and pipe flanges where better fits are desired. Such variations are deemed to be within the scope of this invention.

We claim:

1. A mold bolt for adapting elements so they can be bolted together when their bolt holes fit loosely around a bolt to be subsequently used to secure the elements, but wherein end uses demand that the holes be so sized that the elements fit tightly around the subsequently used bolt, comprising a rod having a head end and a threaded end, the head end including body portion and a head adapted to permit the rod to be rotated for tightening, the threaded end including a stem integral with the body portion and terminal threads, an abutment between the stem and the body portion for confining elements on the stem between the abutment and the threads, the stem being equal in size to the bolt subsequently securing the elements, an interior longitudinal fluid flow passage within the rod extending, from an inlet opening in the head end, through the body portion, into the stem, to a tubular outlet opening in said stem between the abutment and the threads, and a slot through the abutment.

2. The mold bolt of claim 1 carrying elements on its stem, a nut plate compressing the elements, and an O-ring against the nut plate, in combination with means for forcing fluid into the flow passage inlet and through the tubular outlet opening in the stem to fill bolt hole space between the bolt and bolt hole edges when elements are on the stem.

3. A reusable mold for adapting elements so they can be bolted together by a conventional bolt when bolt holes in the elements fit loosely around that conventional bolt, but when end uses demand that the holes be so sized that the elements fit tightly around the conventional bolt, the mold being in the form of a mold bolt comprising a rod having a head end and a threaded end, the head end including a head and a body portion, and the threaded end including terminal threads and a stem the size of the conventional bolt, the head being adapted to permit the rod to be rotated for tightening when the terminal threads are inserted in a nut or nut plate, a shoulder formed as an abutment spaced from the head between the body portion and the stem to confine elements on the stem when a nut or nut plate is tightened on the threaded end, an interior longitudinal fluid flow passage within the rod extending, from an inlet opening in the head end, through the body portion and into the stem to a tubular outlet opening in said stem between the abutment and the threads.

4. The mold bolt of claim 3 carrying elements on its stem and a nut compressing the elements, in combination with means for forcing fluid into the flow passage inlet and through the tubular outlet opening in the stem to fill bolt hole space between the bolt and bolt hole edges of the elements on the stem.

5. The mold of claim 3 wherein the stem is smaller in diameter than the body portion, a shoulder being formed therebetween as a result of this size difference as the abutment for confining elements on the stem, and wherein the terminal threads on the threaded end are identical to those of the conventional bolt.

* * * * *